United States Patent [19]

Chadima, Jr. et al.

[11] Patent Number: 5,038,024

[45] Date of Patent: * Aug. 6, 1991

[54] INSTANT PORTABLE BAR CODE READER

[76] Inventors: George E. Chadima, Jr., 3624 Skylark La. SE., Cedar Rapids, Iowa 52403; Vadim Laser, 994 Twincrest Ct., Cincinnati, Ohio 45231

[ * ] Notice: The portion of the term of this patent subsequent to Feb. 11, 2003 has been disclaimed.

[21] Appl. No.: 364,704

[22] Filed: Jun. 9, 1989

Related U.S. Application Data

[60] Continuation of Ser. No. 325,177, Mar. 17, 1989, which is a division of Ser. No. 234,880, Aug. 19, 1988, abandoned, which is a division of Ser. No. 827,286, Feb. 7, 1986, Pat. No. 4,766,340, which is a continuation of Ser. No. 637,693, Aug. 16, 1984, Pat. No. 4,570,057, which is a continuation of Ser. No. 334,811, Dec. 28, 1981, abandoned.

[51] Int. Cl.$^5$ ............................................. G06K 7/10
[52] U.S. Cl. .................................... 235/472; 235/455; 235/462; 250/566
[58] Field of Search ............... 235/472, 462, 455, 464, 235/440, 483; 250/566

[56] References Cited

U.S. PATENT DOCUMENTS 4,603,262  7/1986  Eastman .......................... 235/472 X
4,766,300  8/1988  Chadima, Jr. ........................ 235/472

*Primary Examiner*—Harold I. Pitts

[57] ABSTRACT

In an examplary embodiment, a hand-held bar code reader has a hand grip portion and a reader head portion which may be held spaced from a bar code data carrier during a reading operation. Light energy is directed outwardly through a window so as to illuminate a bar code sensing region in front of the window having a depth dimension of at least about ten millimeters, and an optical system focuses bar code patterns in the sensing region onto an image photosensor in the reader unit with a resolution so as to read e.g. bar code formats with a minimum bar or space width of about 0.0075 inch, or even less. Preferably the light source is of an electronically triggerable instant response type. The bar code image is converged through a generally rectangular optical aperture.

29 Claims, 7 Drawing Sheets

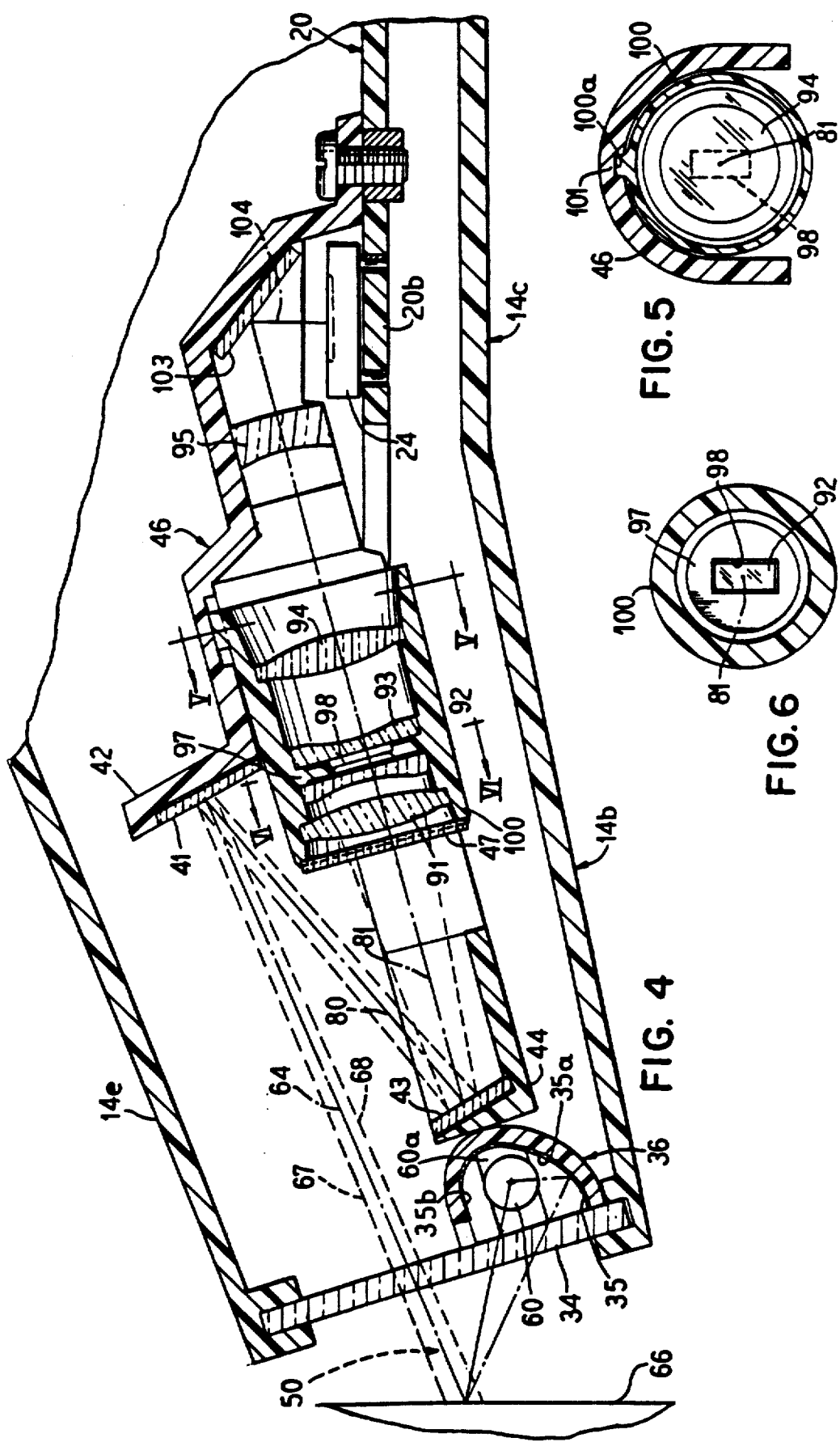

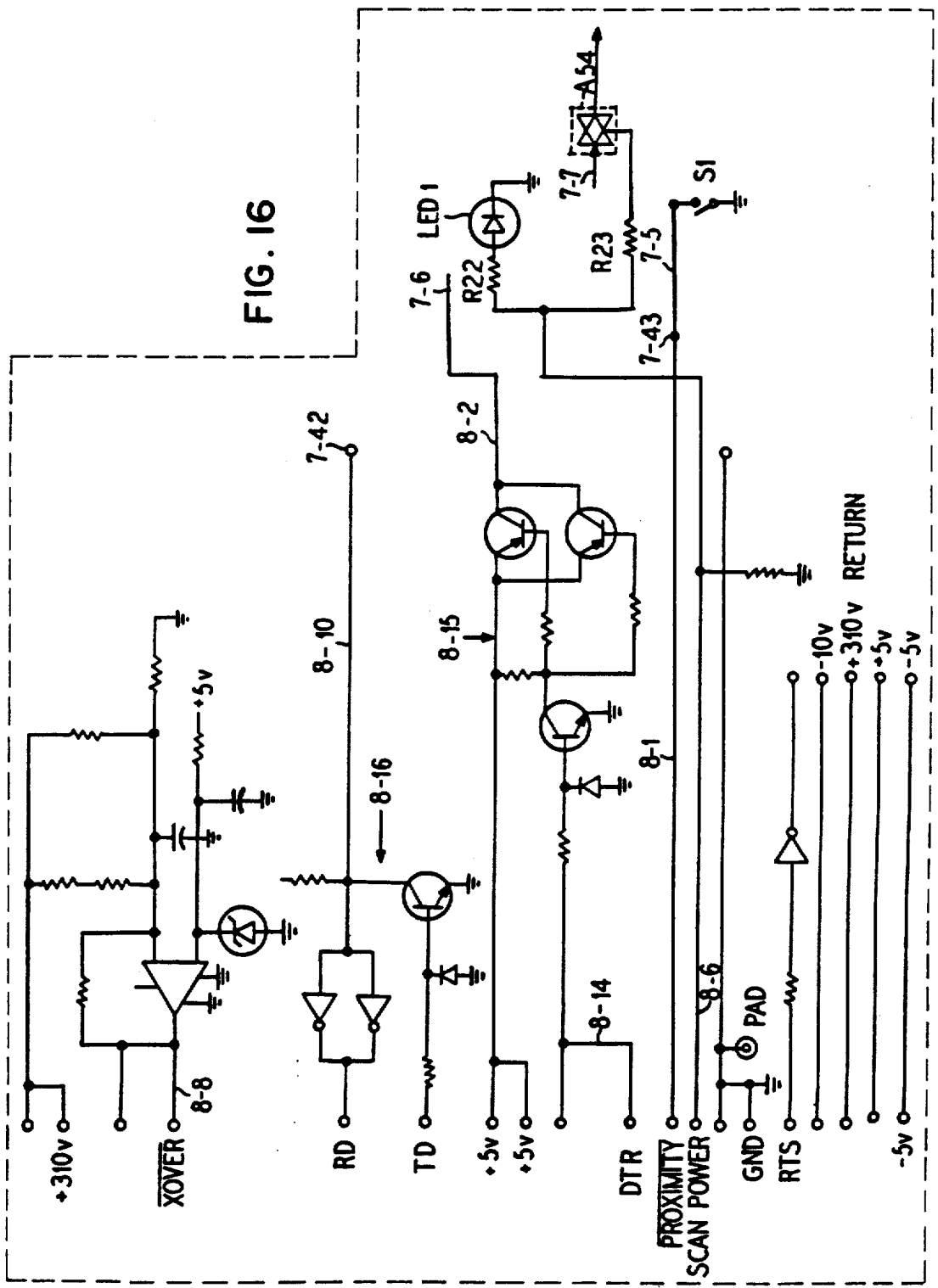

INSTANT PORTABLE BAR CODE READER

CROSS-REFERENCE TO RELATED APPLICATIONS

This application is a continuation of our pending application Ser. No. 07/325,177 which is a division of our application Ser. No. 07/234,880 filed Aug. 19, 1988, now abandoned. Said application Ser. No. 07/234,880 is in turn a division of our application Ser. No. 06/827,286 filed Feb. 7, 1986, now U.S. Pat. No. 4,766,300 issued Aug. 23, 1988. Said application Ser. No. 06/827,286 is a continuation of our prior application Ser. No. 06/637,693 filed Aug. 6, 1984, now U.S. Pat. No. 4,570,057 issued Feb. 11, 1986. Said application Ser. No. 06/637,693 is in turn a continuation of our earlier application Ser. No. 06/334,811 filed Dec. 28, 1981, now abandoned.

SUMMARY OF THE INVENTION

The present invention, in one important aspect, is directed to the provision of a particularly facile and effective hand held reader unit for the instantaneous reading of complete bar code patterns of curved or irregular configuration, and comprising an optical system which accomodates itself to a compact and rugged, yet lightweight construction capable of economical manufacture.

In another aspect, the invention provides a high speed bar code reader system and method which is capable of reading a complete bar code pattern as an entity for computer processing without requiring the reader unit to be moved during the read-in operation; such system and method being further optimized by the provision of a flash illuminator of special configuration for providing a particularly uniform obliquely directed light output over the full depth of the optical field of the reader lens system, and by the provision of a lens system which is adjusted in its spectral response and stop aperture characteristics so as to achieve a high resolution and accuracy over a sufficient depth of field to read high density bar patterns with marked curvature or surface irregularity.

It is therefore an important object of the invention to provide a portable instant bar code reader and method providing improved optical characteristics.

Another object resides in the provision of a bar code reader system and method exhibiting an improved flash type illuminator.

It is also an object of the invention to provide a portable instant bar code reader system and method wherein the optical and electronic construction are interrelated so as to provide for quick-repeat, more accurately focussed reading where an initial reading is ineffective because of marginal reading conditions or the like.

Still another object resides in the provision of a hand held bar code scanner having novel electronic, optical and structural features adapted to the implementation of the various objects set forth above.

Features of the invention include the provision of a reader unit with a wide field of view and substantial focal depth, which yet has a narrow hand grip configuration, and a compact optical system; an optics system which accomodates a single unitary circuit board configuration, a rigid lens mounting arrangement which furthers the achievement of a precise and reliable optical system with a dust and moisture proof enclosure and substantial impact resistance; and an optical system providing an optical field of extended depth coupled with an optimum focus at a selected close up position and electronics for signalling an inaccurate reading and automatically repeating the read operation if necessary as the operator adjusts the unit toward the optimum reading position until a valid reading is achieved.

These and other features, objects and advantages of the present invention will be understood in greater detail from the drawings and the following description wherein reference numerals illustrate a preferred embodiment.

BRIEF DESCRIPTION OF THE DRAWINGS

FIG. 4 is an enlarged partial somewhat diagrammatic view of the reader unit of FIG. 3, the section of FIG. 4 being taken along the lines IV—IV of FIG. 3;

FIG. 5 is a somewhat diagrammatic, cross-sectional view taken along the line V—V of FIG. 4;

FIG. 6 is a somewhat diagrammatic, cross-sectional view taken along the line VI—VI in FIG. 4;

FIGS. 15 and 16 together provide a diagrammatic showing of the electric circuitry for the interface component 17, FIG. 1, where the unit 16 is itself battery operated and portable.

DETAILED DESCRIPTION

Figure 1:
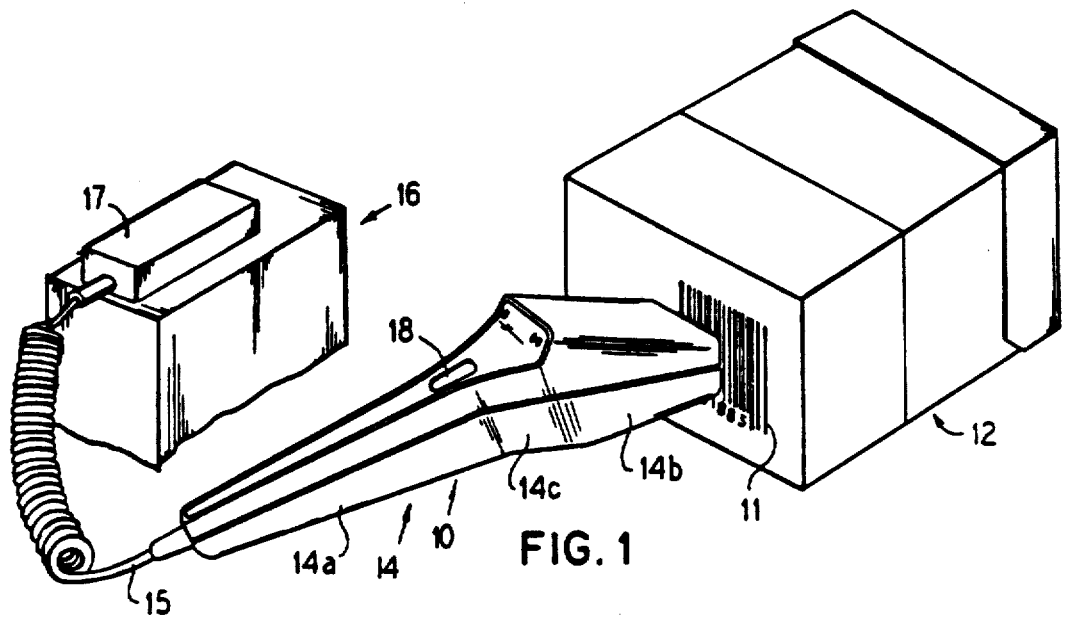
FIG. 1 is a somewhat diagrammatic perspective view illustrating a hand-held reader unit and associated components in operative reading association with a bar code pattern on a container.

Referring to FIG. 1 there is illustrated an overall bar code reader system in accordance with the present invention, and showing a hand-held reader unit 10 in scanning relation to a bar code pattern 11 associated with a product container 12. By way of example, the bar pattern 11 may be formed in accordance with the universal product code and may have a length of 65 millimeters. Various other bar code types are known in the art, such as EAN, CODBAR, CODE 39, INTERLEAVED 2/5, etc.

The hand-held unit is shown as comprising a case 14 including a portion 14a of a size to be gripped by the user, a head portion 14b for containing the reading optics and a connecting portion 14c integrally connecting the hand-grip portion 14a with the optical reading head portion 14b. The head portion 14b has a width so as to be operative to receive a sufficient portion of the bar pattern 11 so as to completely read the same while the head portion 14b is in essentially stationary relationship to the bar pattern 11. Thus, the head portion 14b may have an overall width of 3.0 inches and may have an overall height dimension of one inch. On the other hand, the hand grip portion 14a may taper from an overall width of about one and one-half inches adjacent the intermediate portion 14c to a width of about 0.828 inch at its rear end. The height dimension of the hand grip portion 14a may likewise taper slightly from the intermediate portion toward the rear end portion, from a height dimension of about one and one-quarter inches to about three-quarter inches. The lower margins such as 14d of the hand grip portion 14a are smoothly rounded for example with a radius of curvature of 0.46 inch, the bottom wall of the hand grip portion 14a being formed on a radius of 5.00 inch in the transverse direction so as to enhance the comfort with which the hand grip portion can be grasped. The forward portion of the hand grip portion 14a has a perimeter such that the thumb and first finger of the hand are normally overlapping or touching during handling of the reader unit 10.

With the reader unit 10 resting on a horizontal surface, the intermediate portion 14c will have a separation of approximately three-eighth inch above the horizontal surface, while the top surface 14e of the head portion 14b will extend at a pronounced acute angle to the horizontal which facilitates observation of the bar code pattern as the unit 10 is placed in scanning relation thereto by the user. For example, with the unit 10 resting on a horizontal surface, the upper surface 14e of the head portion 14b may be inclined at an angle of 25° to the horizontal.

The length of the hand grip portion 14a may be about four inches so as to be comparable to the width of the hand when placed in comfortable gripping relation to the unit 10. The overall length of the head portion 14b with the unit 10 resting on a horizontal surface may be about two and one quarter inches measured in a horizontal direction.

A cable 15 is indicated as connecting the unit 10 with host equipment 16 via a suitable link or interface 17. For the case of portable equipment, unit 16 may include a battery, and link 17 may include a battery operated high voltage power supply as well as suitable signal interface circuitry. In this way the complete system of FIG. 1 may be completely portable, without requiring any connecting wires to stationary equipment.

The reader unit 10 may have a weight of eight ounces, an overall length of 7.38 inches, an overall width of 2.63 inches, and a thickness generally of one inch except at a raised section 14f at the rear end of the head portion 14b.

An important feature of the unit 10 of FIG. 1 relates to the provision of a hand-held reader configuration whereby the unit can be readily manipulated in all degrees of freedom and be held at a desired angular relationship to a product container or the like with the four fingers and palm of the hand while the thumb of the user is utilized to depress an operating button 18 located centrally of the top surface of the unit and at the forward end of the hand grip portion 14a. While with the illustrated embodiment a complete reading of the bar pattern 11 takes place in an extremely brief instant, a stable gripping of the hand-held unit during operation is still desirable for the sake of comfort and to minimize fatigue over an extended period of use.

While the bar code pattern 11 is shown on a flat planar surface, it is significant that the reader unit 10 is also effective with curved or irregularly shaped labels. Thus, the bar code pattern 11 may be read even though it extends along a curved surface having a radius of curvature of 1.25 inches, for example. Such a label with a 1.25 inch radius of curvature and with a length dimension of 1.8 inches requires reading of a field with a depth of about 0.4 inch, for example. Thus, certain portions of the bar code pattern 11 may be in direct contact with the operative end of the unit 10 while other portions of the bar code pattern may be spaced by distances of up to 0.4 inch. The illustrated unit is thus effective in reading bar code patterns applied about the curved perimeter of cylindrical containers such as cans, as well as bar code patterns applied to flexible bag type containers and the like.

DESCRIPTION OF FIGS. 2 AND 3

Figure 2:
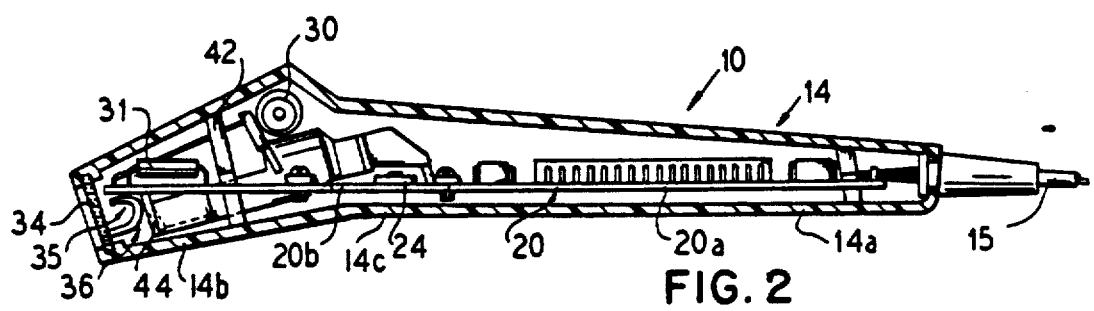
FIG. 2 is a somewhat diagrammatic longitudinal sectional view showing the general layout and configuration of the reader unit of FIG. 1.
Figure 3:
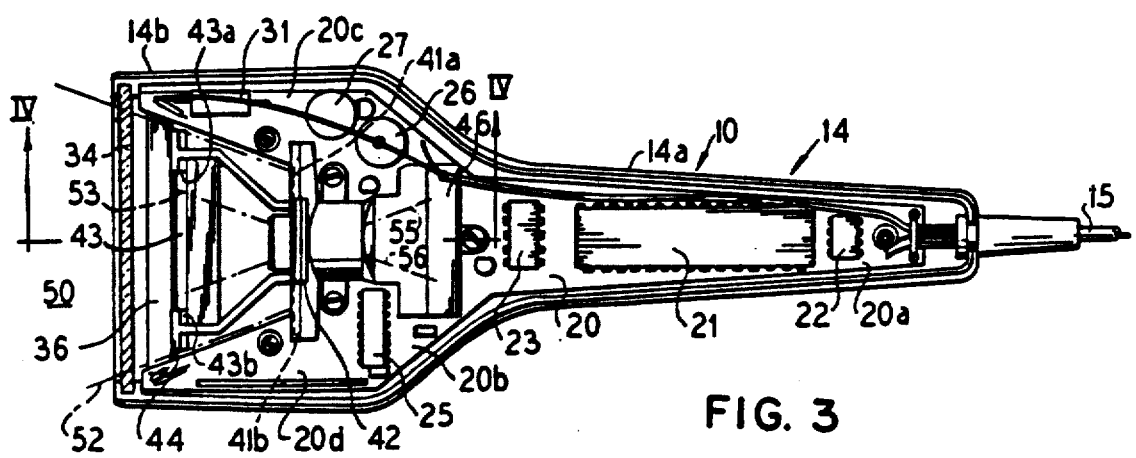
FIG. 3 is a somewhat diagrammatic plan view of the reader unit of FIG. 2 with a top casing part removed and internal components diagrammatically indicated.

FIG. 2 is a longitudinal sectional view of the hand-held reader unit 10 of FIG. 1 illustrating the arrangement of parts therein; and FIG. 3 is a plan view of the reader unit 10 with an upper section of the case 14 removed to show the layout of parts internally of the unit. These views show a printed circuit board 20 having a rear section 20a with a microcomputer integrated circuit pack 21, a bidirectional line driver integrated circuit pack 22, and an analog switch integrated circuit pack 23, for example. Referring to FIG. 2, an intermediate portion 20b of the circuit board 20 carries centrally thereof a photodetector integrated circuit pack 24. As seen in FIG. 3, the intermediate portion 20b of the circuit board carries other components such as an operational amplifier pack 25, a "beeper" component 26 and a transformer 27. In FIG. 2 at a forward portion of the casing 14, a flash energy storage capacitor assembly is physically designated by reference numeral 30, and a triggering capacitor is indicated physically by reference numeral 31. As seen in FIG. 3, the forward portion of the circuit board 20 is separated into two finger portions 20c and 20d arranged at the lateral margins of the case portion 14b.

At the extreme forward end of the casing 14 is an optical window 34 which serves for the optical coupling of the unit 10 with a bar code pattern such as indicated at 11 in FIG. 1. Adjacent a lower portion of window 34 is a flash reflector 35 forming a part of a reading light source assembly 36, shown in further detail in FIG. 4. The light source 36 serves to project a sheet of light through the window 34 for flooding a sensing region of substantial depth in front of the window 34, in which region the bar code pattern 11, FIG. 1, is to be located. The light reflected by a bar code pattern in the sensing region is reflected back through the window 34 so as to impinge on a first mirror 41 of a mirror assembly 42. Light incident upon the mirror 41 is reflected forwardly toward a second mirror 43 of a second mirror assembly 44. From the second mirror 43, light from the sensing region is directed rearwardly into an optical housing 46. The optical housing 46 together with the mirror mounts 42 and 44 are parts of a unitary optical framework which rigidly mounts all of the optical parts including mirrors 41 and 43 and the other optical components including an infrared rejecting filter 47. Further details of the optical system will be apparent from the following description of FIGS. 4-6.

Referring to FIGS. 2 and 3, the width dimension of the reflector 35 of light source 36 may be approximately 2.29 inches, so as to effectively illuminate a sensing region in front of the optical window 34 which may have an extent of about 2.5 inches directly in front of the optical window 34 and an extent of about 2.7 inches at a depth of one inch in front of the window 34. Thus, the total width of the image field may be taken as approximately 65 millimeters at a distance of approximately four millimeters from the center line of the optical window 34. Thus, as viewed in FIG. 3, the marginal rays of the light image entering the unit 10 through the window 34 from the sensing region and converging on the first mirror 41 may each form an angle of convergence relative to a central longitudinal axis of the optical system having a value in the range from about ten degrees to about twenty degrees. Thus, as viewed in FIG. 3, a sensing region 50 in front of the optical window 34 may be defined by marginal light. rays such as indicated at 51 and 52 which are directed through the optical window 34 and converge toward the respective lateral margins of the first mirror 41. The width of the sensing region 50 may be at least fifty millimeters, and the depth of the sensing region 50 may be at least about three millimeters, and preferably at least about ten millimeters. The optical system should be effective to focus the bar code pattern 11, FIG. 1, onto the photodetector 24 for positions within the sensing field 50 with a resolution of at least about forty line pairs per millimeter for an angle of convergence of each marginal ray 51, 52 of about fifteen degrees relative to the central longitudinal axis of the optics as viewed in FIG. 3. This corresponds to resolving bars having a width dimension in the direction of high resolution of about 125 microns (five mils, one mil equals 0.001 inch).

The first mirror 41 may have a length dimension of about 1.6 inches, while the second mirror 43 may have a length dimension of about 1.2 inches, for example. The lateral margins of the first mirror 41 are indicated at 41a and 41b in FIG. 3, while the lateral margins of the mirror 43 are indicated at 43a and 43b in FIG. 3. The marginal light rays as reflected from the mirror 43 toward the filter 47 are indicated at 53 and 54 in FIG. 3. The further margins of the light energy from the sensing region as it passes through the lenses of the optical system are indicated by the dash lines 55 and 56 in FIG. 3. As will be described particularly with reference to FIG. 6 hereafter, the light energy transmitted by the optical system is converged so as to pass through an aperture with a width in the high resolution direction of the bar code pattern 11 with a dimension of about two millimeters, for example. For the illustrated embodiment, the light energy from the sensing region 50 after passing through the narrow optical aperture within the housing 46, diverges over a substantial distance and comes to a focus at a light sensing region of the photodetector 24 having a dimension in the high resolution direction of 26 millimeters, for example, the image from the bar code region 50 being focused in inverted relation onto the light sensitive region of the photodetector 24.

The infrared filter 47 may serve to essentially block infrared radiation having a wave length greater than about 700 nanometers. It is considered that better contrast is obtained by filtering the infrared portion of the light spectrum entering the window 34 from the sensing region 50. Further, it is considered that improved resolution is obtained over the desired depth of the sensing region 50 because of the presence of the infrared filter 47.

The optical window 34 may have a thickness of about 2.5 millimeters and be of a tempered glass material so as to be readily cleaned while resisting breakage. The image of the bar code pattern may be focused onto the light sensitive region of the photodetector 24 through a quartz window having a thickness of 0.5 millimeter and across an air gap of 1.14 millimeter, for example. Thus, the ratio of the length of the image at the bar code sensing region 50 to the length of the focussed image at the light sensitive region of the photodetector 24 may be about 2.5, for example.

DESCRIPTION OF FIGS. 4, 5 AND 6

FIG. 4 is a partial enlarged longitudinal sectional view of the reader unit 10, taken along the lines IV—IV of FIG. 3.

From FIG. 4 it will be seen that light source 36 includes a flash tube 60 which extends for the length of the light source assembly 36. For example, flash tube 60 may have an overall length of 68 millimeters, and may have right angle end portions such as indicated at 60a extending rearwardly from the assembly 36 through slots such as indicated at 61. The tube 60 may have a diameter of four millimeters and may have its center located at a focus of an eliptical portion 35a of reflector 35. Thus, a light ray such as indicated at 62 emitted from the center of the tube 60 will be reflected at the eliptical portion 35a and impinge in the bar code sensing region 50 at a point 63 representing a second focal point with respect to the eliptical configuration of reflector portion 35a. Point 63 is illustrated as lying on an optical axis 64 which intersects the first mirror 41 at a central point. Line 66 in FIG. 4 may represent a surface of a container such as 12 containing a bar code pattern such as indicated at 11 in FIG. 1. Marginal rays of light reflected from the surface 66 in the plane of FIG. 4 are indicated at 67 and 68, for example.

The eliptical portion 35a has an axis such as indicated at 70 which is inclined relative to a normal to the surface of window 34 by an accute angle such as 21°. Thus, light reflected from the eliptical portion 35a is generally directed upwardly and obliquely to the central optical axis 64.

Light directed away from the eliptical portion 35a from the center of tube 60 impinges on a segmental cylindrical portion 35b which serves to redirect the light onto the eliptical portion 35a, again for further reflection in a generally upward direction and obliquely to the central axis 64.

The direct light from tube 60 which penetrates the sensing region 50 is also directed generally upwardly and obliquely to the central optical axis 64.

The resultant direct and reflected light from tube 60 floods the sensing region 50 and defines a sheet of light directed into region 50 obliquely to the central optical axis 64.

As illustrated by dot dash line 80, mirror 41 reflects incoming light energy along an axis 80 from its front surface, and mirror 43 reflects light impinging thereon along a central axis 81 from its front surface.

The light energy directed along the axis 81 impinges on the infrared filter 47 in a substantially nor or perpendicular direction, and the transmitted light energy then traverses a lens system including lenses 91-95. Between lenses 92 and 93 there is provided a light stop member 97 providing a rectangular optical aperture 98. The aperture 98 has a width dimension extending in the high resolution direction of the optical image being transmitted which is substantially less than the vertical dimension corresponding to the direction of low resolution (parallel to the bars of the bar code pattern 11). By way of example, the horizontal dimension of the aperture 98 may be about two millimeters while the vertical dimension may be about four millimeters.

The lenses 91-94 are rigidly mounted by means of a lens barrel 100 having a key 100a fitting into a slot 101 of the optical housing 46. The light stop member 97 may be integral with this light barrel 100. Each of the lenses 91-94 may be symmetrical with respect to the central longitudinal axis 81 passing through the center of the rectangular aperture 98.

As seen at the right in FIG. 4, the optical axis 81 intersects a reflecting mirror 103 whose front surface is reflective so as to direct the light energy along an axis 104 normal or perpendicular to the light sensitive surface of the photodetector 24 which is mounted on the printed circuit board 20 at the intermediate region 20b.

DESCRIPTION OF FIG. 7

Figure 7:
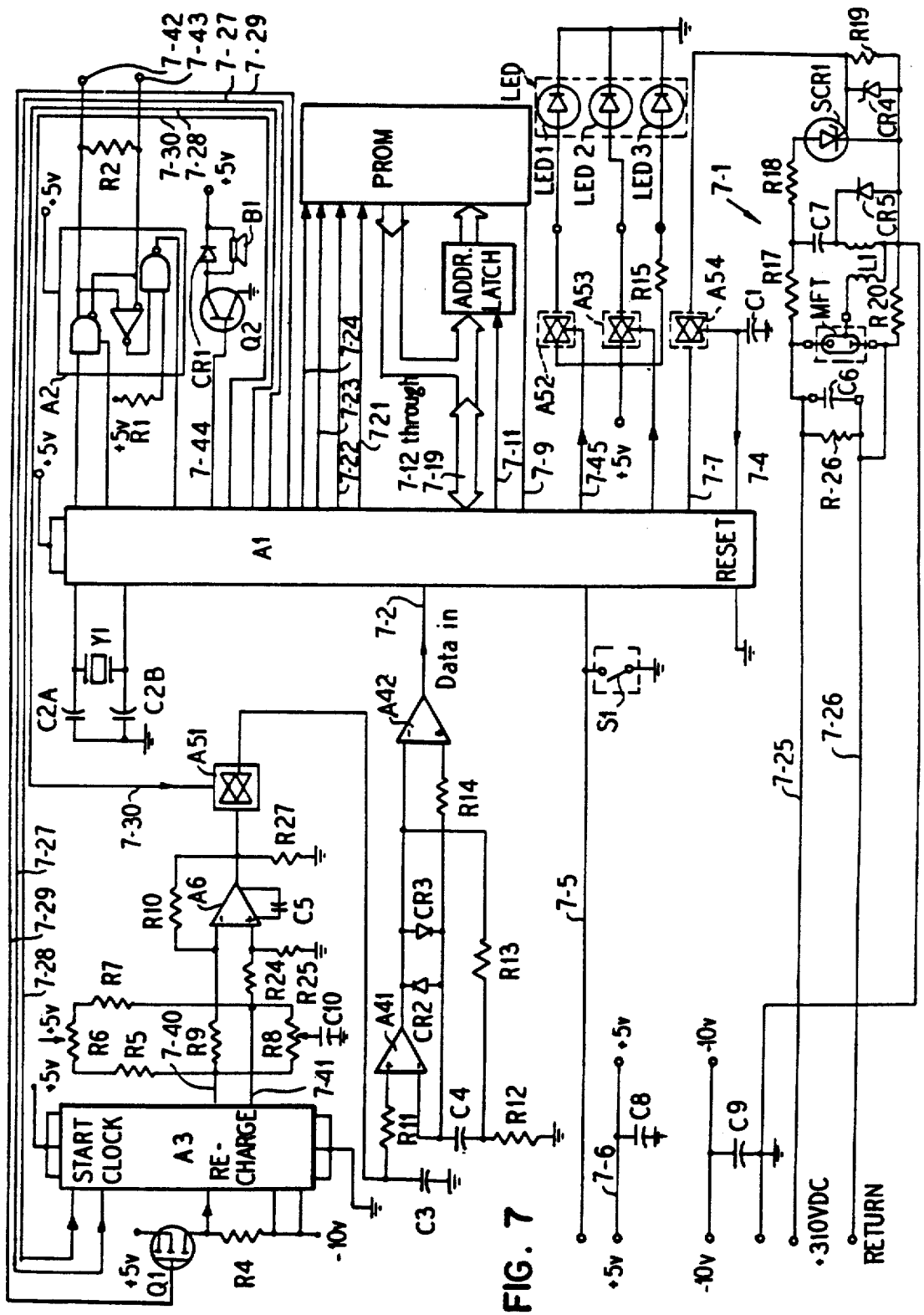
FIG. 7 is a diagrammatic illustration showing exemplary details of a suitable electric circuit configuration for the system of FIGS. 1 through 6.

FIG. 7 is an overall diagrammatic view showing the electric circuitry which is housed within the portable hand-held unit itself. The following description applies to the operation of this circuitry whether it is associated with a portable battery operated terminal or with a fixed installation such as a cash register, computer port or the like.

The hand-held unit is placed near the bar code pattern to be read and the trigger switch actuator associated with switch S1, FIG. 7 is momentarily depressed. In response to such signal from switch S1 or a comparable proximity sensor, microprocessor A1 outputs a signal to the flash tube section indicated at 7-1 in the lower right portion of FIG. 7. The tube MFT flashes and the bar code image is reflected through an optical system to a 1024 element diode array line scanner indicated at A3 in the upper left of FIG. 7. This image is rapidly shifted out, filtered, amplified and squared up before passing to the "Data In" input 7-2 of the microprocessor A1.

The microprocessor A1 processes this input data, calculates bar spacing and widths and derives the bar code number. If the number is not valid, the microprocessor retriggers the flash tube MFT and repeats the reading process. The final valid number is serially shifted out of the microprocessor A1 and into the data device such as a Norand model 101 terminal, a cash register, a computer port or the like.

In point of sale (POS) applications, the microprocessor A1 is left on continuously. When first turned on, input 7-4 of microprocessor A1 (RESET) is held low by capacitor C1. The capacitor C1 charges and when input line 7-4 exceeds 2.5 volts, the microprocessor is ready to begin program execution.

In a portable application utilizing battery power, the reader unit operates from a battery pack, and to prolong its life, the microprocessor is powered down when not needed. With such portable operation, when trigger switch S1 is closed, a scan proximity line 7-5 goes low, this line being connected with a model 101 terminal. Such terminal then applies 5 volts at input line 7-6 so as to supply power to the microprocessor A1. With power applied, capacitor C1 charges and when its voltage value is above 2.5 volts, the microprocessor is placed in operational condition. In addition, output line 7—7 from microprocessor A1 is isolated from the flash tube circuit 7-1 by means of a bilateral switch A54. During power up and down, the potential on output line 7—7 changes unpredictably and could flash the lamp MFT; to prevent this, bilateral switch A54 is opened during this interval.

The microprocessor A1 controls all functions within the hand-held unit. For the illustrated embodiment, the application program may reside in an external programmable read only memory PROM. To access the PROM, the microprocessor outputs the address as two data groups. The low address bits are placed onto the data bus 7-12 through 7-19 and are latched by a data latch associated with the PROM circuit when output 7-11 goes high then low again. The microprocessor then outputs the remaining address on output lines 7-21 through 7-24. The PROM retrieves the data byte from the location chosen by the address bus. When output line 7-9 from the microprocessor goes low, the PROM outputs are enabled and output the data byte onto the data bus for transfer to microprocessor A1. In another embodiment of the invention, the microprocessor A1 will include up to four kilobytes (4K) of internal factory masked program read only memory.

The flash tube section 7-1 is powered via lines 7-25 and 7-26 from an external power source. A voltage of 310 volts is supplied from a user supplied source of power. A voltage of 400 volts may be supplied from the model 101 previously mentioned. The applied power charges a charge storage capacitor C6 connected across the miniature flash tube MFT. The flash tube contains two electrodes with Xenon gas separating them. A fine wire is wound around the cathode end of the tube. When a high voltage is applied to this wire, the Xenon gas is ionized, lowering the resistance between the end electrodes. The gas breaks down, releasing light energy in the process. The capacitor is rapidly discharged as a very high current spike creating the intense light output. When the current and voltage fall below the gas sustaining potential, the flash is extinguished and the gas again becomes nonconductive. The actual flash is of very short duration.

To create the trigger voltage, the 310 volts is stepped up by a trigger transformer L1 and capacitor C7. In the quiescent state, a silicon controlled rectifier SCR1 is non-conducting and the trigger circuit is open. The capacitor C7 in series with the primary of transformer L1 is charged to 310 volts peak through a current limiting resistor R17.

When the microprocessor is ready for a flash it drives output line 7—7 high so as to cause the silicon controlled rectifier SCR1 to conduct and to complete the trigger circuit. Current flows from the capacitor C6 through SCR1 to the other side of the trigger transformer L1. The 310 volt capacitor pulse is stepped up through transformer action to over 4,000 volts (4K V) and is sent to the flash tube MFT, triggering a flash. The capacitor C6 is discharged, and the loop current decays toward zero. Output line 7—7 returns to a low potential condition and when the current through SCR1 is less than its latch-up value, SCR1 returns to the non-conducting state and the capacitor C6 begins recharging.

For point of sale applications, capacitor C6 is a low leakage electrolytic and is constantly across the power supply. This allows rapid recharge and flash rates to occur.

For the case of a portable power supply, power for capacitor C6 is generated by a small step-up converter that is located in the portable interface module. There is also a sense circuit that monitors the voltage on the charged storage capacitor C6 and turns off the converter when the capacitor is charged, and turns it back on again after a flash or when the capacitor charge has leaked down to approximately 375 volts (375 VDC). Because this unit is operating off of battery power, it takes much longer to recharge the capacitor than in the case of a point of sale unit. Recharge time takes from 300 to 500 milliseconds (300 to 500 MSEC), depending on the state of the batteries.

Component A3 in FIG. 7 is a 1024 element line scanner, for example, Reticon RL 1024 G integrated circuit pack. The scanner component A3 comprises a row of silicon photodiodes, each with an associated storage capacitor on which to integrate photocurrent, and a multiplex switch for periodic readout via an integrated shift register scanning circuit. Each photo diode capacitor is charged to a known level; then the array is exposed to the bar code. Light areas cause the photodiodes to discharge their associated capacitors while dark area photodiode capacitors retain full charges. The shift register scanner is stepped from element to element and the capacitor voltage level is read out to the microprocessor until all 1024 elements have been read.

Within the scanner are two photodiode arrays. Both arrays contain photodiodes and capacitors. The video array produces the actual bar code image while the dummy array is masked from the light source. Scanner switching noises are induced capacitively into both arrays and interfere with the video signal. As the scanner is stepped, the video and dummy outputs are presented to an external differential operational amplifier A6. The common mode noise on the lines is effectively cancelled, leaving only the video differential signal for further processing.

The microprocessor A1 controls all signals that cause the scanner A3 to operate. Before the flash tube is fired, the scanner capacitors are charged to +5 volts (+5 V). Microprocessor output 7-28 goes high then low at the START input of scanner A3 to reset the scanner internal shift register to the first element. Processor output line 7-29 goes low turning on the transistor Q1 and thus bringing the scanner recharge input to plus five volts. Internally the first scanner element capacitors are charged in the dummy and video arrays through their respective MOS transistors. Processor output line 7-27 sends one pulse to the scanner CLOCK input and the scanner shift register turns off the first element, then turns on the second element MOS transistor, and the second set of capacitors in the dummy and video arrays are recharged. Processor output 7-27 continues pulsing the clock input of scanner A3 until all 1024 capacitor elements have been charged. In addition, the integrating charge capacitor is charged to plus five volts.

The processor initiates the signal at 7—7 that fires the flash tube, and the bar code pattern is reflected through optics onto the scanner photodiode video array. Where light falls, the photodiode capacitors discharge.

Processor output 7-28 leading to the START input of the scanner goes high then low, resetting the scanner shift register to the first element position.

The MOS transistor is turned on and the charge from the integrating charge capacitor discharges into the photodiode's associated capacitor. If the element was exposed to white light, i.e. a white bar, the capacitor is discharged. The integrating charge capacitor equalizes with the photodiode capacitor. If the element was dark, the capacitor would not discharge and the integrating charge capacitor would discharge very little. A MOS buffer amplifier senses the capacitor charge and places the voltage level on scanner output line 7-40 of component A3. The dummy array element capacitor also is charged by the integrating charge capacitor associated with this array. A second MOS amplifier places the capacitor voltage level on scanner output line 7-41.

Scanner output lines 7-40 and 7-41 change simultaneously in potential as a result of switching noises coupled into the arrays but only output 7-40 contains valid video information. The small capacitor size limits the charge that can be held and it begins dissipating rapidly. This factor plus various circuit losses limits the output voltage swings at output lines 7-40 and 7-41 between zero and four millivolts (4 mV).

Processor output lines 7-29 returns low and the transistor Q1 turns on and biases the scanner RECHARGE input to five volts so that the photodiode's capacitor and integrating charge capacitor recharge to plus five volts in both arrays.

Processor output 7-27 pulses high then low to the scanner CLOCK input, stepping the internal shift register to the second element in both the video and dummy arrays. The above sequence repeats and the second element capacitor is read out to the processor via output lines 7-40 and 7-41.

Scanner outputs 7-40 and 7-41 contain noise impulses from various switching circuits. These outputs are presented to a balanced differential input operational amplifier A6. The operational amplifier A6 cancels the noise of equal amplitude and phase.

The video output 7-40 of scanner component A3 contains valid data not present on output 7-41 so that this valid data is not cancelled and instead is amplified to a usable level for the following circuits. The amplifier provides a voltage input to output gain of approximately 68 times. Across the scanner output is a DC balancing network R6 through R9 and a simple noise filter to permit the differential amplifier A6 to produce a cleaner output.

Before the processor steps the scanner to the next element, it samples the differential output from amplifier A6. For this purpose output line 7-30 goes high to the bilateral switch A51 enabling it to pass the signal output from operational amplifier A6 to charge capacitor C3 of a sample and hold circuit. After a preset period processor line 7-30 returns low and capacitor C3 holds the output of operational amplifier A6.

A zero crossing detector is associated with the output of capacitor C3 and comprises an operational amplifier A41, two diodes CR2 and CR3, resistors R12, R13 and R14 and capacitor C4. The signal from the scanner is a sine wave signal and this signal is squared by means of the zero crossing detector. The operational amplifier gain is set at four and amplifies the incoming wave form. Capacitor C4 is also charged but at a slower rate and its voltage remains lower. When the incoming wave form rises to within 0.7 volt of the capacitor peak voltage the second operational amplifier A42 senses the voltage change and its output snaps to the opposite state. The diode CR2 is forward biased and discharges capacitor C4 while the input falls. When the input begins to rise and comes within 0.7 volt, the other diode CR3 is turned on and the second operational amplifier A42 senses this difference and the output changes to the opposite state.

The processor A1 samples input 7-2 (DATA IN) for a signal level. After opening the sample gate A51 by means of line 7-30 the program waits for several milliseconds to allow the operational amplifiers to stabilize. The processor A1 checks the input port 7-2 at a time when the operational amplifier output will be a valid high or low level.

The processor shifts the scanner to look at the next element then samples if the level is high (corresponding to a white bar area) or low (corresponding to a dark bar area). The processor keeps track of the number of elements that are high (white) and when the black area starts, stores the number of white elements in memory and begins counting the dark elements. When the white area begins, the dark element count is stored and the processor begins counting the white elements. After all 1024 elements have been read, the processor has a pattern of white and dark element counts corresponding to the dark and white widths of the code pattern. The processor program algorithm uses these counts to derive the bar code number.

If the final number does not match its check number or the number of bars is incorrect, the processor repeats the read process again until a correct number is produced. For a point of sale unit, the processor will retry for twenty times, then turns off. Releasing the switch S1 resets the processor for the next read cycle. For a portable unit, because it runs at a slower rate, the processor will continue flashing of the light source MFT until the pattern number is recognized or the unit switch S1 is opened.

When a valid pattern number is derived, the processor converts the number to an ASCII character string and outputs these to a bidirectional line driver A2 shown at the upper right in FIG. 7. The TTL (transistor transistor logic) level data is converted to a differential signal and is sent to a suitable receiver via output lines 7-42 and 7-43.

On a portable unit, the processor output port is tied directly to the portable interface module. The portable interface module then gates the data signal to the model 101 unit previously mentioned. The portable interface module also converts the EIA level signals from the model 101 unit to the TTL level required by the circuitry of FIG. 7.

For use with a point of sale unit, the processor will provide an output at line 7-44 to beep the small on board speaker B1 when there is a good scan, as well as supplying an enabling signal to output line 7-45 so as to light a green LED indicated at LED1 at the lower right of FIG. 7. The diode LED2 emits red light so as to indicate an error condition. The portable unit does not require a speaker and relies upon the model 101 to sound its internal beeper element for a valid number.

Figure 8:
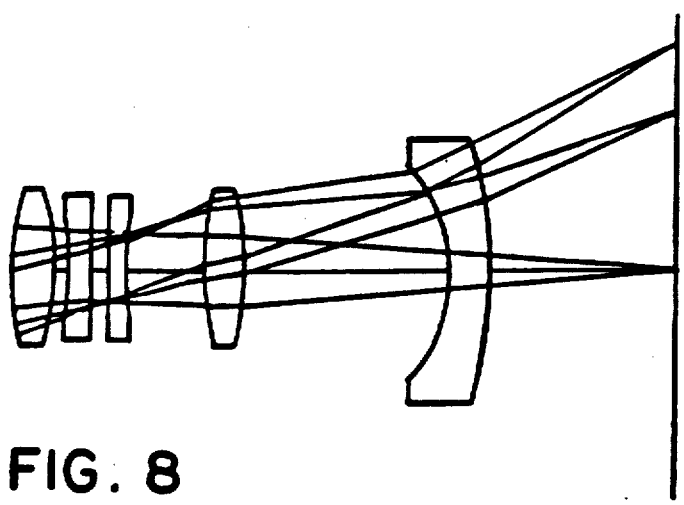
FIG. 8 is a somewhat diagrammatic view illustrating the basic optics of the illustrated embodiment and showing the lens arrangement generally in the plane of FIG. 3.

FIG. 8 is a plot of a specific exemplary optical system embodying lenses 91-95, stop aperture member 97 with aperture 98, and showing optical surfaces S1-S4 and S1-S11 of the lenses 91-95 in a plane through the respective vertices at axis 81.

The system of FIGS. 8-14 has essentially the characteristics previously described including a resolution at ± fifteen degree converging marginal rays 51, 52, FIG. 3, of forty line pairs per millimeter, and a depth of focus of about twenty-five millimeters, and a close-in optimum focal plane located about six millimeters in front of the front surface of window 34. The system can resolve the previously described high density bar code with five mil code intervals and a 1.8 inch length on a surface with a radius of curvature of about 1.25 inch. Thus the depth of field for sensing sharply curved bar code patterns extends to at least ten millimeters in front of the front surface of window 34.

In FIGS. 8-14, the focal length of the system is 24.23 millimeters and the magnification is −0.3300. The f-number is f/8.3.

Figure 9:
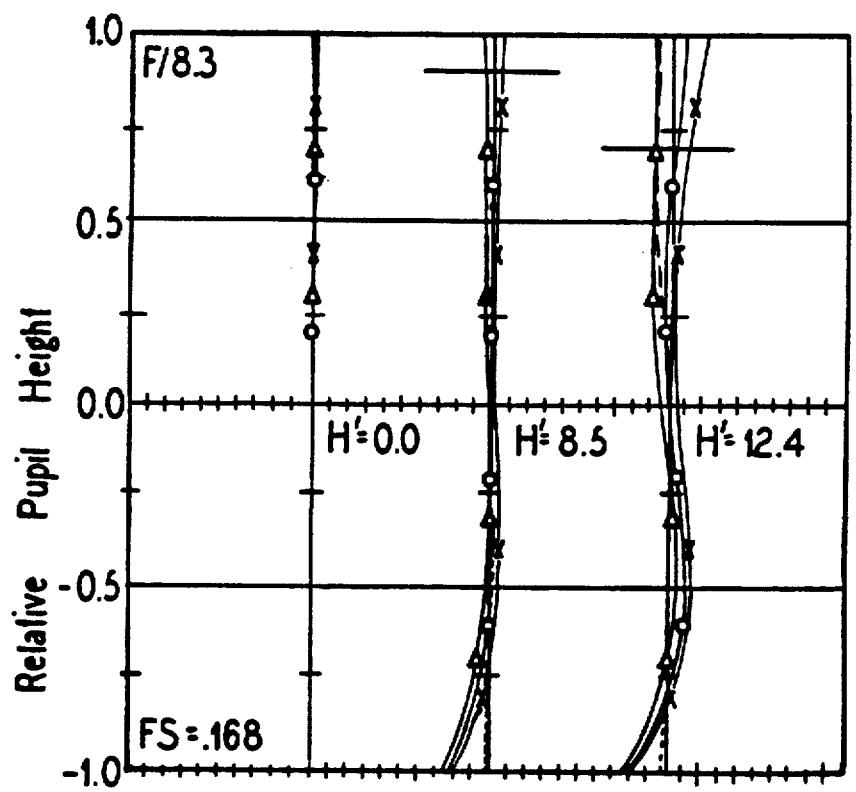
FIG. 9 is a plot illustrating lateral aberrations for the system of FIGS. 1 through 8.

FIG. 9 is a plot showing lateral aberrations of the lens system for green, blue and red wavelengths of light. The ordinate shows relative pupil height, and the abscissa is plotted for image heights H' in millimeters. In each of FIGS. 8-14, the solid lines T refer to the tangential plane while the dash lines refer to the sagittal plane. In FIG. 9, the dotted lines refer to the "SAG Y" or Y component of the sagittal ray fan.

Figure 10:
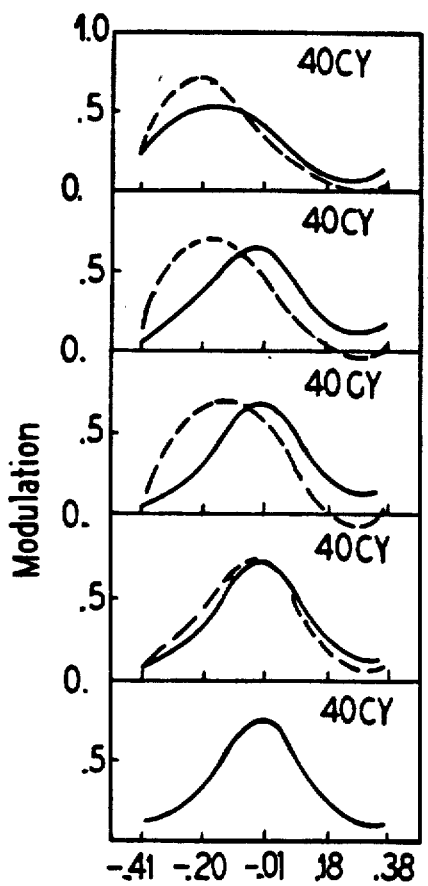
FIGS. 10 and 11 show optical transfer functions for the system of FIGS. 1 through 9, FIG. 10 being for the "Through Focus" condition and FIG. 11 being for the "Best Focus" condition.
Figure 11:
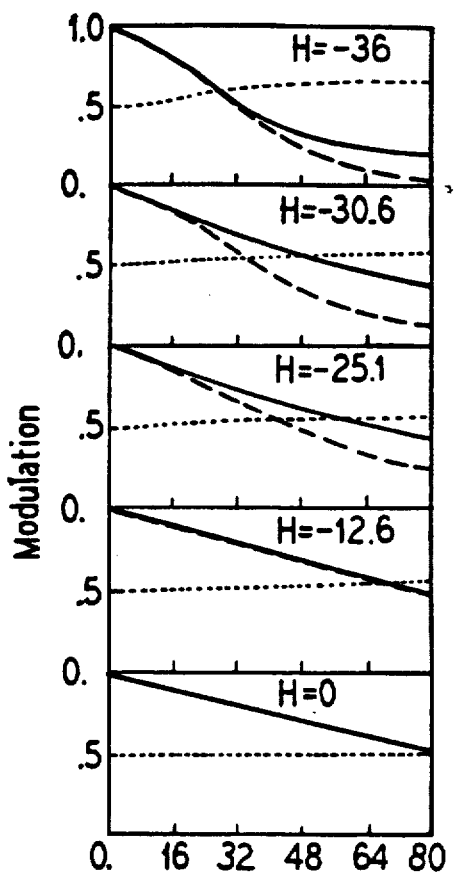

FIGS. 10 and 11 show plots of the optical transfer function with ordinate scales of relative values from zero to one for modulation, and with abscissa values in millimeters. FIG. 10 is taken for the "Through Focus" condition and FIG. 11 refers to the "Best Focus" condition of −0.01 millimeter as shown in FIG. 10, the lowermost plot.

FIGS. 10 and 11 show the desired resolution of forty cycles per millimeter. Again the solid lines are for the T or tangential plane and the dash lines are for the S or sagittal plane. The dotted lines in FIG. 11 show the phase variation of the optical transfer function.

The five plots in each of FIGS. 10 and 11 are for respective object heights H in millimeters, namely H=−36 mm, H=−30.6 mm, H=−25.1 mm, H=−12.6 mm, and H=0 mm.

Figure 12:
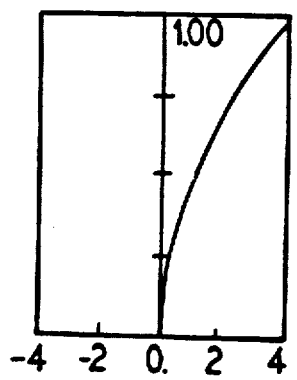
FIGS. 12, 13 and 14 illustrate radial distortion, geometrical astigmatism, and MTF astigmatism, respectively, for the system of FIGS. 1 through 11.
Figure 13:
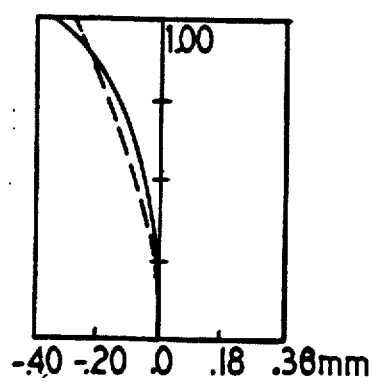
Figure 14:
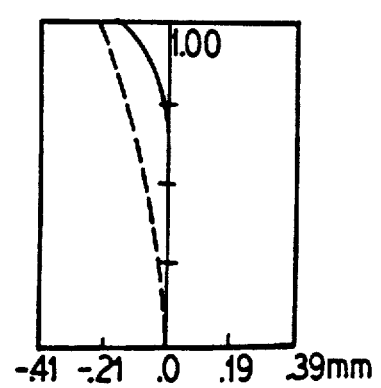

FIGS. 12-14 are plots showing radial distortion, geometrical (classical) astigmatism, and MTF astigmatism. The ordinate scale shows relative values between zero and one, while the abscissa scale is in millimeters relative to the focus position.

An exemplary set of specifications of the lens system which gave the results of FIGS. 8 through 14, is as follows, (the optical surfaces being indicated in parenthesis for the respective lenses):

| Lens Ref. Number (and Lens Surface) | Exemplary Lens System Specification | | Clear Aperture (diameter millimeters) |
|---|---|---|---|
| | Radius (millimeters) | Thickness (millimeters) | |
| 91(S1) | 13.5153 | 2.40000 | 6.98 |
| 91(S2) | −17.1251 | 1.10247 | 6.04 |
| 92(S3) | −10.8715 | 1.40000 | 4.75 |
| 92(S4) | −37.7869 | .50000 | 4.03 |
| 97(S5) | plano | .50000 | 3.69 |
| 93(S6) | 37.7869 | 1.40000 | 3.83 |
| 93(S7) | 10.8715 | 4.31965 | 4.31 |
| 94(S8) | 17.1251 | 2.40000 | 8.50 |
| 94(S9) | −13.5153 | 12.00000 | 8.91 |
| 95(S10) | −7.9373 | 2.00000 | 11.08 |
| 95(S11) | −37.4635 | 12.04436 | 13.68 |

Lenses 91, 94 and 95 are of an acrylic lens material known as type 493 572, and lenses 92 and 93 are of a polystyrene lens material, type 592 307.

In FIG. 8, the following dimensions apply as system first order properties:

f/9.00, H=−30.000 mm
magnification −0.4000
OBD=−92.9562 mm (object plane 0 to S1)
BRL=28.0221 mm (S1 to S11 along axis 81)
IMD=12.0444 mm (S11 to image plane I)
OVL=133.023 mm (object plane 0 to image plane I)

In FIG. 4, the axis of the elliptical reflector portion 35a may intersect axis 64 at ten millimeters in front of the front surface of window 34.

The details of a lens system which is effective to transmit an optical image of a bar code pattern from a sensing field 50 with a depth of about one inch and a width of about 2.5 inches to a flat photodetector surface twenty-five microns wide and about one inch in length, is as follows:

mirror 41 at an angle of 57.5 degrees to axis 81, plus or minus fifteen minutes of arc;

distance along axis 64 from bar code sensing region 50 to the front reflective surface of mirror 41, about 46.5 millimeters;

distance along axis 80 from the front reflective surface of mirror 41 to the front reflective surface of mirror 43, about 20.5 millimeters;

mirror 43 at an angle of 75 degrees plus or minus ten minutes of arc, relative to axis 81;

distance along axis 81 from front reflective surface of mirror 43 to first lens surface (S1) of lens 91, about 19.5 millimeters;

distance along axis 81 from first lens surface (S1) of lens 91 to back lens surface (S9) of lens 94, about fourteen millimeters;

distance along axis 81 from the back lens surface (S9) of lens 94 to the vertex of the concave front surface (S10) of lens 95, about twelve millimeters;

distance along axis 81 from the back convex surface (S11) of lens 95 to the front reflective surface of mirror 103, about 7.5 millimeters plus or minus 0.1 millimeter;

distance along axis 104 from the front surfave of mirror 103 to the image plane of photodetector 24, about 3.5 millimeters plus or minus 1 millimeter mirror 103 at an angle of about 37.5 degrees plus or minus ten minutes of arc, relative to axis 81;

angle between axis 81 and the plane of the printed circuit board 20, about fifteen degrees.

Thus, the total optical distance along axes 64, 80, 81 and 104 is about 125 millimeters. This optical path occupies a physical length of the casing 14 of about seventy-five millimeters, so that a substantial reduction in the length of the forward portion of unit 10 is achieved.

Figure 15:
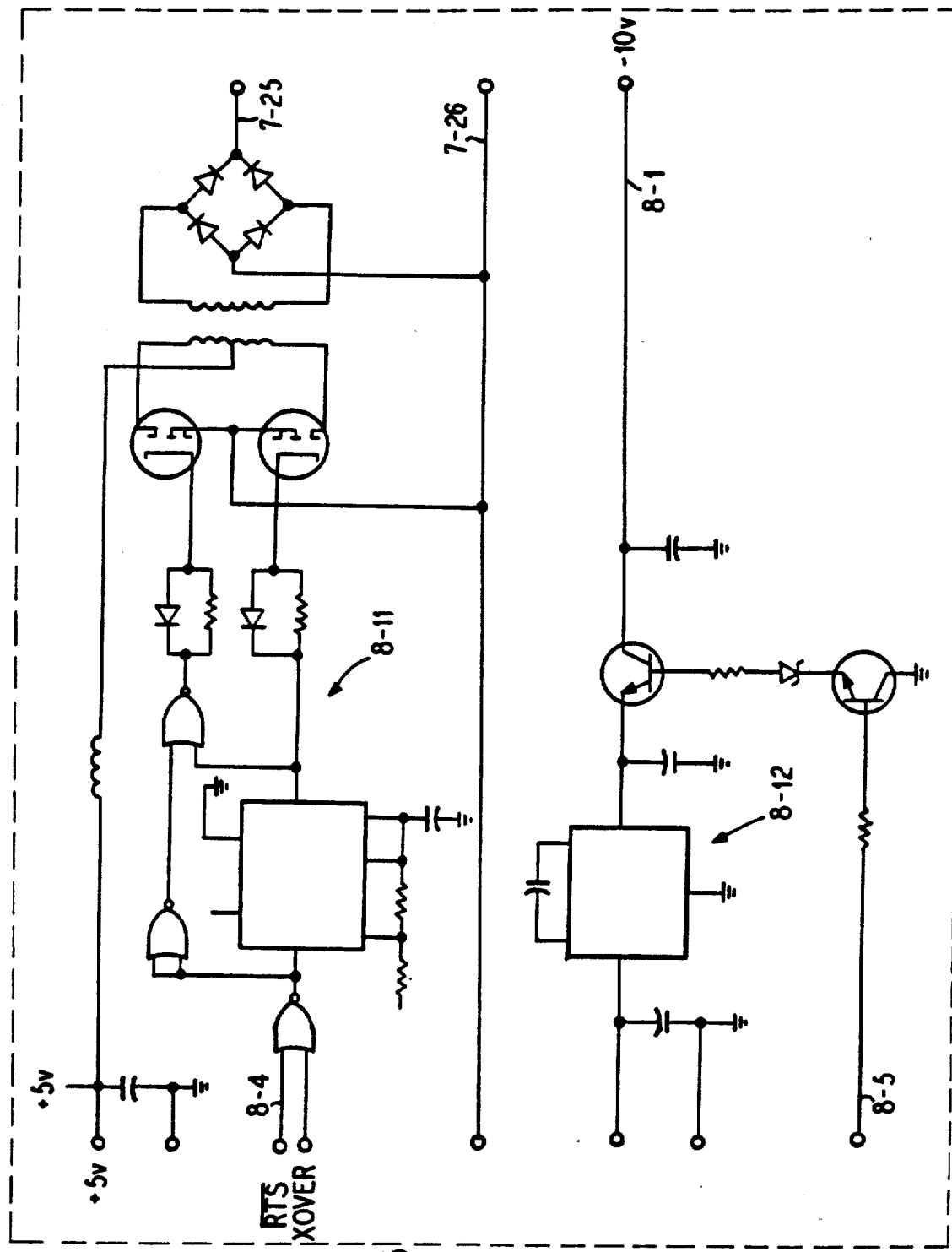

FIGS. 15 and 16 show the circuitry for interface 17 when it is associated with a Model 101 portable system corresponding to component 16 in FIG. 1.

For the case where the circuitry of FIGS. 15 and 16 is associated with the reader circuit of FIG. 7, switch S1 will be decoupled from processor A1, and actuation of button 18 to close switch S1 will be transmitted via conductors 7-5, FIG. 7 to point 7-43 shown at the upper right of FIG. 7, and from this point via conductor 8-1, FIG. 16, to the "$\overline{\text{PROXIMITY}}$". The interface module 17 of FIGS. 15 and 16 plugs into the model 101 unit 16 and provides any required level conversion between the model 101 and the reader unit of FIG. 7. The interface module of FIG. 16 generates plus 400 volts for the flash tube and the minus ten volts for the scanner module A3. Both of these supplies and the plus five volts from output 8-2 of FIG. 16 are switched at the interface module under Model 101 control.

A scan is initiated when the trigger switch S1, FIG. 7, is depressed. This gives a "$\overline{\text{PROXIMITY}}$" signal to the model 101 via conductor 8-1 in the same manner as a prior art scanning wand. After receiving $\overline{\text{PROXIMITY}}$, the model 101 checks $\overline{\text{XOVER}}$ to verify that the high voltage is charged to an acceptable level. If not, the model 101 circuit raises RTS at 8-4, FIG. 15 to enable the high voltage charge circuit. The model 101 then waits for $\overline{\text{XOVER}}$ to go low, or up to 750 milliseconds, whichever comes first. If the $\overline{\text{XOVER}}$ signal does not indicate a valid high voltage within the 750 millisecond time out, a charge error is indicated. If $\overline{\text{XOVER}}$ goes valid within the 750 millisecond time-out then the model 101 drops RTS and raises DTR at 8-5, FIG. 15. The DTR signal is used by the interface module to switch the low voltage supplies to the reader unit of FIG. 7.

After raising DTR, the model 101 waits for a Bell (07 HEX) from the reader circuit of FIG. 7. The time-out for this is also 750 milliseconds. If the Bell is not received, a bad scan is assumed. After receiving the Bell, the model 101 sends a three character control word to the reader of FIG. 7. The first character is the minimum length expected, added to an ASCII 0 (30 HEX), the second character is the maximum length expected, added to an ASCII 0 and third character is an ASCII ACK (06 HEX). The minimum and maximum are sent in this fashion to reduce communication overhead and still maintain an ASCII protocol.

After the control word is sent, the model 101 turns on SCAN POWER at 8-6, FIG. 16 to enable the strobe. The model 101 monitors $\overline{\text{XOVER}}$ to detect a flash and waits up to 100 milliseconds before assuming a bad scan. After $\overline{\text{XOVER}}$ at 8-8, FIG. 16, goes low, the model 101 waits up to 750 milliseconds for the reader to send the decoded bar code data. If no data is received at line 8-10, FIG. 16, within 750 milliseconds or if the reader sends an ASCII "*", a bad scan is indicated and a retry will be attempted if $\overline{\text{PROXIMITY}}$ at line 8-1 is still present.

If valid data is received from the reader, then the first character indicates which type of label was scanned. The decoded label then follows with a modulus ten hash digit, and ASCII carriage return, and an ASCII line feed added onto the end.

If the data meets the model 101 requirements for a good scan, then the model 101 drops DTR at conductor 8-5 and powers off the reader unit. If not, then an ASCII NAK is sent to the reader, and a retransmission is requested. If the data was good, then the model 101, under application control, can indicate a good scan on the reader by turning on SCAN POWER at 8-6, FIG. 16.

FIG. 15 shows the circuitry at 8-11 for the flash tube firing. When the RTS input 8-4 is active, the 300 volt direct current generator charges its output capacitor to the maximum voltage $V_M$ and is shut off by the signal XOVER until the output voltage reaches a fixed lower voltage $V_L$ at which point the 300 volt generator is started until the output reaches $V_M$. If RTS is inactive, the 300 volt generator is off.

Section 8-12 in FIG. 15, supplies minus ten volts to output 8-1, which in turn supplies component A3, the diode array chip A3 of FIG. 7. When DTR at 8-5 is active, conductor 8-14, FIG. 16 is also active so as to switch plus five volts from the model 101 to output line 8-2 via circuit block 8-15, so that the processor A1 is powered up.

A data link circuit is indicated at 8-16 in FIG. 16 which interfaces the READ (RD) signal and the TRANSMIT DATA (TD) signals from the model 101 over a single line 8-10 to the reader processor A1 via terminal 7-42 at the upper right in FIG. 7.

The proximity line 8-1 of FIG. 16 is an input to the model 101 indicating that the operator has depressed the reader button 18 requesting a read operation.

The SCAN POWER line 8-6 is an output from the model 101 allowing the flash tube to be fired by the reader processor A1 (via output 7-7).

In operation, the model 101 receives a request to scan (PROXIMITY) signal via conductor 8-1 FIG. 16 from the reader circuit of FIG. 17. The model 101 raises DTR at 8-14 which turns on the reader processor A1. The reader processor sends a "Bell" signal to the model 101 via terminal 7-42 and conductor 8-10, FIG. 16. The model 101 checks XOVER at 8-8 for full charge. When 300 volts is charged (XOVER) the model 101 sends the reader a go ahead character via conductor 8-10, FIG. 16, and terminal 7-42, and enables the flash via SCAN POWER at 8-6, FIG. 16. The reader decodes the data from the scanner A3, FIG. 7, and sends a character or characters back to the model 101 via terminal 7-42 and conductor 8-10, FIG. 16. If a valid character is read, it is passed to the model 101. The cycle is complete and will not start again until the button 18 is released and depressed again by the operator. If the reader gets an invalid code a character (*) is sent to the model 101 indicating no read and the cycle starts again.

In the portable application, the reader unit operates from the battery pack of the model 101 and to prolong its life, the central processing unit A1, FIG. 7, is powered down when not needed.

When the trigger switch S1 is closed, the model 101 proximity line, 7-5, FIG. 7, 8-1, FIG. 16, goes low. The model 101 applies five volts to the central processing unit A1. The capacitor charges and above 2.5 volts at C1, FIG. 7, releases the central processing unit A1 to operate. In this mode, however, conductor 7-4 and the upper plate of capacitor C1 are disconnected from the gate of switch A54, switch A54 instead being controlled via line 7-6 as shown in FIG. 16. In addition, output line 7-7 from processor A1, FIG. 7, is isolated from the flash tube circuit by the bilateral switch A54. During power-up and down, conductor 7-7 from the processing unit A1 changes unpredictably and could flash the lamp, so that the bilateral switch A54 is opened. Because the bilateral switch A54 is controlled by the same signal that drives the green LED 1 (good scan). FIG. 16, the switch A54 is only turned on for a short time. It is timed to coincide with the reader flash signal from conductor 7-7 at the output of processor A1. The switch A54 is also turned on during the time the green LED 1 is on to indicate a good scan.

In the commercial equipment, fixed base, versus portable components 16 were implemented by a circuit arrangement which eliminated the need for jumpers by going to a cut-only arrangement.

To correct a band width problem, the op-amp A6 was changed to a type CA3130E. This part has a much higher gain-band width product than the amplifier previously used. It is also more stable over the temperature range and voltage range. The second and third stages use an LM358N, (A41 and A42, FIG. 7) which was comparable to a previous part.

The recharge control transistor Q1 was changed from a 2N3906 to a VP0106 to eliminate the need for two resistors. The existing circuit was stabilized over temperature by the addition of a 2.2 kilohm resistor, but it became apparent that there was no room for the extra resistor. The VP0106 also eliminated a further resistor allowing other parts to be moved around.

In checking the alternating current noise adjustment at R8, FIG. 7, it became apparent that there was an unknown noise element. This was found to be caused by the lack of output load on amplifier A6. By adding R27, a ten thousand ohm pull-down resistor to the output of the CA3130E operational amplifier, the noise was eliminated. After adding R27, the adjustment of R8 was easy to complete.

The circuits as shown herein were deemed ready for release to production. The changes indicated were considered to accomplish some significant improvements.

Exemplary product specifications for a commercial reader unit in accordance with the present invention are as follows:

Using a standard UPC-A label, the read rate design goals are:

| First Read Rate | 95% |
| --- | --- |
| Second Read Rate | 98% |
| Third Read Rate | 99.5% |

Not more than 7.3 errors in ten thousand accepted reads (per "The Effect of the Design of the IBM Proposed UPC Symbol and Code on Scanner Decoding Reliability").

Depth of field: Up to 0.4 inch (ten millimeters).

The reader will read bar codes with a minimum bar/space width of 7.5 mils (0.0075 inch) at a contrast ratio of 50% or greater. Each bar or space must be within plus ten percent of its nominal size, and the maximum width of a bar code is 1.8 inches from first start bar to last stop bar, including add on, if any. A quiet zone of not less than five times the narrowest element of the start or stop bars is required on each end.

Minimum label radius must be greater than 1.25 inches for a 1.8 inch label.

The reader will currently support the following codes: UPC-A, UPC-E, EAN-13, and EAN-8 with or without add-on 2 or 5.

The scanning modules are encoded in ROM and can be modified to support other bar codes at the factory.

It will be apparent that many modifications and variations may be effected without departing from the scope of the novel concepts and teachings of the present invention.

What we claim is:

1. A portable instant reader for reading complete lines of bar code information, said reader comprising a hand-held bar code reader unit having window means providing a bar code sensing region in front of said window means, said window means receiving reflections of light from a complete line of bar code information in the bar code sensing region, a photodetector positioned within said hand-held bar code reader unit in the path of light rays reflected through said window means, said photodetector having a light sensitive region for receiving an image of a complete line of bar code information from said bar code sensing region, and an optical system within said hand-held bar code reader unit positioned between said window means and said photodetector for receiving a light pattern from said window means in accordance with a complete line of bar code information and focusing the same onto said light sensitive region of said photodetector, said optical system having an optical aperture with a width dimension in the high resolution direction of the optical image being transmitted which is substantially less than the height dimension corresponding to the direction of low resolution.

2. A portable instant reader according to claim 1, with said optical system having a depth of focus of at least about three millimeters in said bar code sensing region.

3. A portable instant reader according to claim 2, with said optical aperture having a width dimension of not substantially greater than two millimeters.

4. A portable instant reader acoording to claim 1, with said optical aperture having a width dimension of not substantially greater than two millimeters.

5. A portable instant reader according to claim 1, with said optical system having an optical axis extending through said window means and having effective marginal rays extending from said window means to the bar code sensing region and diverging at angles of about plus and minus fifteen degrees to the optical axis, said optical system converging the effective marginal rays so as to pass through the optical aperture and then come to a focus at the light sensitive region of the photodetector.

6. A portable instant reader according to claim 5, with said optical aperture having a width dimension of not substantially greater than two millimeters.

7. A portable instant reader according to claim 1, with said optical system having a generally rectangular optical aperture with its narrow dimension in the high resolution direction of the optical image being transmitted.

8. A portable instant reader according to claim 7, with said generally rectangular optical aperture having a narrow dimension of not substantially greater than two millimeters.

9. An optical pattern recognition reader capable of reading complete lines of bar code information, said reader comprising:
a hand-held optical reader unit including
an illuminator,
means for triggering the illuminator to illuminate a complete line of bar code information,
optoelectronic image sensor means, and
optical system means comprising lens means having an optical axis and producing an optical image of a complete line of bar code information from the illumination thereof by said illuminator and focusing the same onto said optoelectronic image sensor means,
said optical system means having optical aperture means with a width dimension in the high resolution direction of the optical image being transmitted which is substantially less than the height dimension corresponding to the direction of low resolution.

10. An optical pattern recognition reader according to claim 9, with said optical aperture means having a width dimension of not substantially greater than two millimeters.

11. An optical pattern recognition reader according to claim 9, said lens means having effective marginal rays extending out of the hand-held optical reader unit and diverging at angles of about plus and minus fifteen degrees relative to the optical axis, said optical system means converging the effective marginal rays so as to pass through the optical aperture means and then come to a focus at the optoelectronic image sensor means.

12. An optical pattern recognition reader according to claim 11, with said optical aperture means having a width dimension of not substantially greater than two millimeters.

13. An optical pattern recognition reader according to claim 9, with said optical system having a generally rectangular optical aperture.

14. An optical pattern recognition reader according to claim 13, with said generally rectangular optical aperture having a narrow dimension of not substantially greater than two millimeters.

15. The method of reading bar code patterns which comprises:
(a) receiving a light image from a sensing region having a width dimension at least equal to the length of the total bar code pattern and of a substantial height dimension,
(b) converging the rays of said light image to pass through an aperture having a width dimension in a high resolution direction of the bar code pattern, and having a height dimension which is substantially greater than the width dimension of the aperture,
(c) focusing the light image onto a light receiving region of a photodetector having a resolution sufficient to sense a predetermined bar code, and
(d) reading out the individual elements of the light image focused on the photodetector for processing into bar code data.

16. The method of claim 15, where the photodetector has a predetermined operative length dimension in a direction of high resolution along which the focused light image is to impinge,
the converging of the rays of said light image being such as to pass through an aperture having a width dimension substantially less than the predetermined operative length dimension of the light receiving region of the photodetector,
said method further comprising causing the rays of the light image passing through said aperture to diverge so as to impinge over substantially the entire operative length dimension of the light receiving region of the photodetector, while blocking from the photodetector all light rays not passing through said aperture.

17. The method of claim 15, said method further comprising directing light rays reflected from a sensing region having a depth of at least about ten millimeters through said aperture, and onto said photodetector with a depth of focus of at least about ten millimeters.

18. The method of claim 17, said method further comprising filtering out a long wavelength region of the spectrum of light energy from the sensing region prior to passage of the light energy through said aperture.

19. The method of claim 15, said method further comprising filtering out a long wavelength region of the spectrum of light energy from the sensing region prior to passage of the light energy through said aperture.

20. The method of reading bar code patterns which comprises:
(a) receiving a light image from a sensing region having a width dimension at least equal to the length of the total bar code pattern and of a substantial height dimension,
(b) converging the rays of said light image to pass through a generally rectangular aperture having a width dimension in a high resolution direction of the bar code pattern and having a height dimension which is substantially greater than the width dimension of the aperture,
(c) focusing the light image onto a light receiving region of a photodetector having a resolution sufficient to sense a predetermined bar code, and
(d) reading out the individual elements of the light image focused on the photodetector for processing into bar code data.

21. The method of claim 20, where the photodetector has a predetermined operative length dimension in a direction of high resolution along which the focused light image is to impinge, the converging of the rays of said light image being such as to pass through an aperture having a width dimension substantially less than the predetermined operative length dimension of the light receiving region of the photodetector, said method further comprising causing the rays of the light image passing through said aperture to diverge so as to impinge over substantially the entire operative length dimension of the light receiving region of the photodetector, while blocking from the photodetector all light rays not passing through said aperture.

22. The method of claim 20, said method further comprising directing light rays reflected from a sensing region having a depth of at least about ten millimeters through said aperture, and onto said photodetector with a depth of focus of at least about ten millimeters.

23. The method of claim 22, said method further comprising filtering out a long wavelength region of the spectrum of light energy from the sensing region prior to passage of the light energy through said aperture.

24. The method of claim 20, said method further comprising filtering out a long wavelength region of the spectrum of light energy from the sensing region prior to passage of the light energy through said aperture.

25. The method of reading bar code patterns which comprises:

(a) receiving a light image from a sensing region having a width dimension at least approximately equal to the length of the total bar code pattern and of a substantial height dimension, (b) converging the rays of said light image to pass through an aperture having a width dimension in a high resolution direction of the bar code pattern, and having a height dimension such that the ratio of said height dimension to the width dimension of the aperture is at least about two to one, (c) focusing the light image onto a light receiving region of a photodetector having a resolution sufficient to sense a predetermined bar code, and (d) reading out the individual elements of the light image focused on the photodetector for processing into bar code data.

26. The method of claim 25, where the photodetector has a predetermined operative length dimension in a direction of high resolution along which the focused light image is to impinge, the converging of the rays of said light image being such as to pass through an aperture having a width dimension substantially less than the predetermined operative length dimension of the light receiving region of the photodetector, said method further comprising causing the rays of the light image passing through said aperture to diverge so as to impinge over substantially the entire operative length dimension of the light receiving region of the photodetector, while blocking from the photodetector all light rays not passing through said aperture.

27. The method of claim 25, said method further comprising directing light rays reflected from a sensing region having a depth of at least about ten millimeters through said aperture, and onto said photodetector with a depth of focus of at least about ten millimeters.

28. The method of claim 27, said method further comprising filtering out a long wavelength region of the spectrum of light energy from the sensing region prior to passage of the light energy through said aperture.

29. The method of claim 25, said method further comprising filtering out a long wavelength region of the spectrum of light energy from the sensing region prior to passage of the light energy through said aperture.

* * * * *